(12) United States Patent
Lotgerink-Bruinenberg (10) Patent No.: US 7,717,986 B2
(45) Date of Patent: May 18, 2010

(54) VEHICLE PASSENGER COMPARTMENT AIR FILTER DEVICES

(75) Inventor: Marcus Lotgerink-Bruinenberg, Hagen (DE)

(73) Assignee: 3M Innovative Properties Company, St. Paul, MN (US)

( * ) Notice: Subject to any disclaimer, the term of this patent is extended or adjusted under 35 U.S.C. 154(b) by 225 days.

(21) Appl. No.: 11/815,997

(22) PCT Filed: Mar. 2, 2006

(86) PCT No.: PCT/US2006/007529

§ 371 (c)(1),
(2), (4) Date: Aug. 10, 2007

(87) PCT Pub. No.: WO2006/096486

PCT Pub. Date: Sep. 14, 2006

(65) Prior Publication Data

US 2008/0148946 A1 Jun. 26, 2008

(30) Foreign Application Priority Data

Mar. 7, 2005 (EP) ................................. 05004897

(51) Int. Cl.
*B01D 39/00* (2006.01)
*B60H 3/06* (2006.01)

(52) U.S. Cl. ......................... 96/135; 96/154; 55/385.3; 55/527; 55/DIG. 39; 442/289; 442/414; 442/417

(58) Field of Classification Search ................ 96/15, 96/108, 134, 135, 153, 154; 55/385.3, 527, 55/DIG. 39; 210/502.1, 503; 454/69; 442/340, 442/381, 389, 414, 417

See application file for complete search history.

(56) References Cited

U.S. PATENT DOCUMENTS 4,375,718 A 3/1983 Wadsworth et al.

(Continued)

FOREIGN PATENT DOCUMENTS

DE 41 43 237 A1 7/1993

(Continued)

OTHER PUBLICATIONS

Wente, "Superfine Thermoplastic Fibers", Industrial and Engineering Chemistry, 1956, vol. 48, pp. 1342-1346.

(Continued)

*Primary Examiner*—Frank M Lawrence
(74) *Attorney, Agent, or Firm*—Aleksander Medved (57) ABSTRACT

A vehicle passenger compartment air filter device comprising a filtration medium comprising a nonwoven web of electret charged thermoplastic microfibers as a filter layer, said microfibers having an effective fiber diameter of greater than 10 μm and comprising a thermoplastic resin having a resistivity greater than 1014 ohm·cm and an additive selected from fluorochemical compounds or oligomers, organic triazine compounds or oligomers, hindered amine compounds, aromatic amine compounds, nitrogen containing hindered phenols, metal containing hindered phenols and mixtures thereof; said web having a basis weight less than 60 g/m2; and a gas adsorption layer comprising an adsorbent particle loaded layer and optionally further comprising a support layer and/or a cover layer bonded to said adsorbent layer; the basis weight of adsorbent particles in gas adsorption layer being at least 150 g/m2; wherein the filter layer is upstream from the gas adsorption layer and wherein the filter layer and gas adsorption layer are co-pleated and substantially non-bonded to one another except optionally at one or more of the outer edges of the filtration medium.

20 Claims, 1 Drawing Sheet

U.S. PATENT DOCUMENTS

| | | | |
|---|---|---|---|
| 4,588,537 A | | 5/1986 | Klaase et al. |
| 4,592,815 A | | 6/1986 | Nakao |
| 5,057,710 A | | 10/1991 | Nishiura et al. |
| 5,221,573 A | * | 6/1993 | Baigas, Jr. .................. 428/212 |
| 5,401,446 A | | 3/1995 | Tsai et al. |
| 5,411,576 A | | 5/1995 | Jones et al. |
| 5,472,481 A | | 12/1995 | Jones et al. |
| 5,496,507 A | * | 3/1996 | Angadjivand et al. ....... 264/423 |
| 5,512,172 A | | 4/1996 | Marble |
| 5,679,122 A | | 10/1997 | Moll et al. |
| 6,261,342 B1 | | 7/2001 | Rousseau et al. |
| 6,423,123 B1 | | 7/2002 | Rosenberg et al. |
| 6,432,175 B1 | | 8/2002 | Jones et al. |
| 6,627,563 B1 | * | 9/2003 | Huberty ....................... 442/91 |
| 2003/0207635 A1 | | 11/2003 | Minemura et al. |
| 2004/0016345 A1 | * | 1/2004 | Springett et al. ............... 96/66 |

FOREIGN PATENT DOCUMENTS

| | | |
|---|---|---|
| EP | 0 383 236 B1 | 8/1990 |
| EP | 0 818 230 B1 | 1/1998 |
| EP | 0 713 421 B1 | 8/1998 |
| EP | 0 955 087 A1 | 11/1999 |
| EP | 1 068 889 A1 | 1/2001 |
| EP | 1 197 255 B1 | 6/2006 |
| JP | 4-74505 | 3/1992 |
| JP | 8-281030 | 10/1996 |
| JP | 2000-117023 | 4/2000 |
| WO | WO 97/07272 | 2/1997 |

OTHER PUBLICATIONS

Wente et al., "Manufacture of Superfine Organic Fibers", Report No. 4364, Naval Research Laboratories, May 25, 1954, 20 pages.

Lotgerink-Bruinenberg, "Vehicle Passenger Compartment Air Filter Devices", U.S. Appl. No. 11/912,261, filed Oct. 22, 2007. This application is a national stage filing under 35 U.S.C. 371 of PCT/US2006/014085.

* cited by examiner

VEHICLE PASSENGER COMPARTMENT AIR FILTER DEVICES

CROSS REFERENCE TO RELATED APPLICATIONS

This application is a national stage filing under 35 U.S.C. 371 of PCT/US2006/007529, filed Mar. 2, 2006, which claims priority to European Application No. 05004897.4, filed Mar. 7, 2005, the disclosure of which is incorporated by reference in its/their entirety herein.

This invention relates to vehicle passenger compartment air filter devices, in particular filtration media thereof, suitable for filtration of air borne particles and gases in air for a passenger compartment of such a vehicle.

Vehicle passenger compartment (or automotive interior cabin) filtration is a particularly difficult filtration application, due to the targeting of particle filtration and/or gas adsorption together with a demand for very low pressure drop performance in consideration of limited fan capabilities, all within highly limited space considerations. Commercial vehicle passenger compartment air filters typically use pleated, multilayer bonded filtration media laminates for filtering air borne particles and/or gases. Such multilayer bonded filtration media typically include 3 or more filtering layers (e.g. pre-(particle) filter, main filter layer, ultra fine filament particle filter layer and a gas adsorption layer) plus cover and support layers for ease in handling and/or structural integrity. These filters, however suffer a number of drawbacks including low loading capacity and relatively high pressure drop through the filter. Furthermore, in order to keep pressure drop within acceptable limits, although still not satisfactorily or desirably low, particle capture (filtration) efficiency must often be compromised. This disadvantage of compromised particle capture efficiency is most often compounded by the observance of a loss of particle capture efficiency as a function of time, e.g. upon loading or exposure, of such filter media and filters.

In light of the increasing awareness of the hazards associated with certain air borne particles, such as sub-micron particles or particulates, as well as the hazards associated with exposure of various gases, there is an ongoing need for vehicle passenger compartment air filter devices, in particular filtration media thereof, having high particle capture efficiency, in particular high sub-micron particle capture efficiency combined with high loading capacity, effective gas adsorption and low pressure drop performance while possessing stable operating characteristics, e.g. maintaining particle capture efficiency upon loading and/or exposure.

According to the invention there is provided a vehicle passenger compartment air filter device comprising a filtration medium comprising (i) a nonwoven web of electret charged thermoplastic microfibers as a filter layer, said microfibers having an effective fiber diameter (EFD) of greater than 10 μm and comprising a thermoplastic resin having a resistivity greater than $10^{14}$ ohm·cm and an additive selected from fluorochemical compounds or oligomers, organic triazine compounds or oligomers, hindered amine compounds, aromatic amine compounds, nitrogen containing hindered phenols, metal containing hindered phenols and mixtures thereof; said web having a basis weight less than 60 g/m$^2$; and (ii) a gas adsorption layer comprising an adsorbent particle loaded layer and optionally further comprising a support layer and/or a cover layer bonded to said activated carbon layer, wherein basis weight of adsorbent particles in gas adsorption layer is at least 150 g/m$^2$;

said filter layer being upstream from the gas adsorption layer and the filter layer and gas adsorption layer being co-pleated and substantially non-bonded to one another except optionally at one or more of the outer edges of the filtration medium.

Surprisingly, it was found that inter alia desirably high loading capacity (e.g. loadings of at least 20 g after an increase in pressure drop of 100 Pa) and high initial particle capture efficiency (e.g. initial particle capture efficiency of at least 90% for 0.4 μm particles) as well as a favorable maintenance of high particle capture efficiency upon loading (e.g. particle capture efficiency of at least 87% for 0.4 μm particles during loading upon an increase of 50 Pa in pressure drop) can be achieved together with desirably effective gas adsorption. In particular such advantageous performance can be achieved without the application of a particle filter layer upstream from the described filter layer (a pre-filter layer) and/or an additional particle filter layer (besides the described filter layer and gas adsorption layer) downstream from the described filter layer. This is also advantageous relative to cost considerations as well as dimensional and pleating considerations facilitating favorable performance. Also advantageous low initial pressure drops can be achieved (e.g. a pressure drop of not more than 100 Pa for filters with a filter face area of 250 mm×200 mm, a pleat height of 30 mm and a pleat distance (peak to peak) of 5 to about 12 mm at a volumetric flow rate of 225 m$^3$/h).

The dependent claims define further embodiments of the invention.

The invention, its embodiments and further advantages will be described in the following with reference to the following drawings or figures.

It is to be understood that the present invention covers all combinations of suitable, particular, desirable, advantageous, favorable and preferred aspects of the invention described herein.

Figure 1:
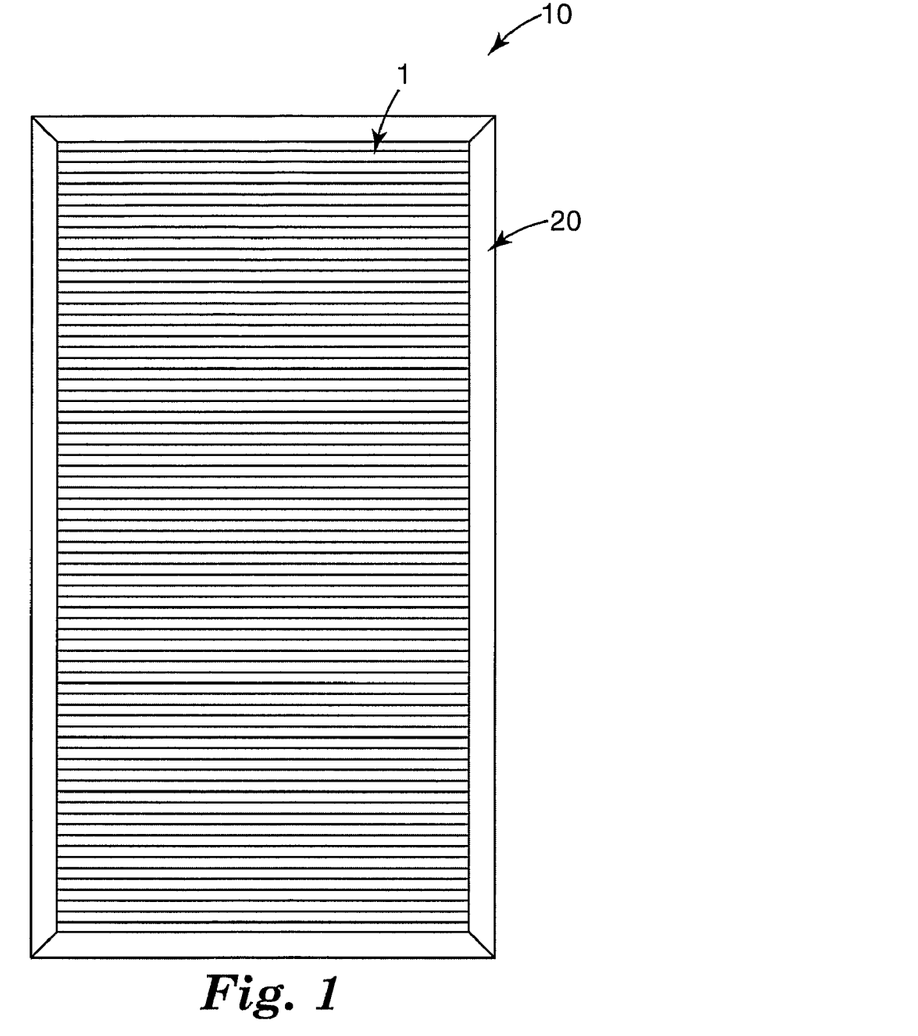
FIG. 1 represents a schematic view of an exemplary vehicle passenger compartment air filter device.

Referring to FIG. 1 showing a schematic view of an exemplary filter device for filtering air flowing in the passenger compartment of a vehicle, such a device (10) comprises a filtration medium (1). The device (10) may also include a frame or a housing (20) onto which the filtration medium may be connected. Typically such a frame or housing is made of polymeric material. The filtration medium (1), in particular its outer edges, may be sealed to a portion of the inner wall of the frame or housing, for example through adhesive or by ultrasonic welding such as described in U.S. Pat. No. 5,512, 172. Alternatively the filtration medium, again its outer edges, may be sealed to the frame or housing wall while producing the frame by inject molding, whereby the edges of the filtration medium will be then embedded by the plastic material of the frame after the insert molding process. A suitable insert molding technique is described in U.S. Pat. No. 5,679,122 and EP 713 421.

Figure 2:
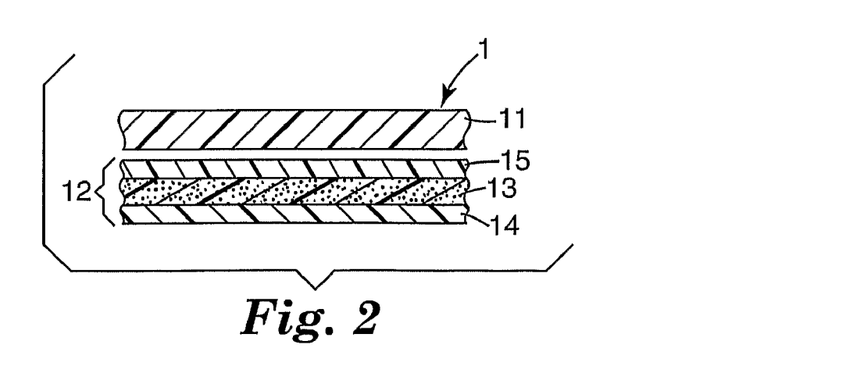
FIG. 2 represents a schematic, enlarged cross-sectional view of a region of an exemplary filtration medium suitable for use in vehicle passenger compartment air filter device.

Referring to FIG. 2 showing a schematic, partial cross-sectional view of an exemplary filtration medium (1) e.g. suitable for use in the exemplary filter device shown in FIG. 1, the filtration medium includes a filter layer (11) (described in detail below) upstream from a gas adsorption layer (12) (described in detail below). The gas adsorption layer includes an adsorbent particle loaded layer (13), preferably an activated carbon layer. As can be appreciated from the exemplary filtration medium (1) shown in FIG. 2, the gas adsorption layer (12) may include a support layer (14) for example downstream of the adsorbent layer. Generally if such a support layer is used, it is bonded or affixed to the adsorbent layer. The gas adsorption layer may also include a cover layer (15) upstream of the adsorbent layer. The cover layer, if used, is typically bonded or affixed to the adsorbent layer. The filter layer (11) and gas adsorption layer (12) are co-pleated and substantially non-bonded, preferably non-bonded, to one another except optionally at the outer edges or periphery of the filtration medium. One or more of the outer edges may be bonded to form a seam along said edge(s) or around the periphery of the medium for example in order to facilitate handling and/or converting and/or connection to a frame or a housing, if used. The term "substantially non-bonded" preferably means less than 4% bonding, more preferably less than 2% bonding, relative to the total surface area of the filtration medium excluding, if present, any bonded seam area along an outer edge or outer edges or periphery of the medium. If present, the surface area of any bonded seam area along an outer edge or outer edges or periphery of the medium will typically represent less than 8% (more suitably less than 6%, most suitably less than 4%) of the total surface area of the filtration medium.

The filtration medium comprises a nonwoven web, preferably a meltblown nonwoven web, of electret charged thermoplastic microfibers as a filter layer. For desirable filtration performance it has been found advantageous that the microfibers have an effective fiber diameter (EFD) of greater than 10 μm. For further enhanced performance, the EFD is more desirably about 11 μm or higher, most desirably about 12 μm or higher. Suitably EFD is 20 μm at most, more desirably 18 μm at most, most desirably 16 μm at most. EFD is determined according to the method set forth in Davis, C. N. "The Separation of Airborne Dust and Particulates," Proc. Inst. Mech. Engrs., London, 1B, p. 185, (1952).

The thermoplastic microfibers of the filter layer comprise a nonconductive thermoplastic resin, i.e. a thermoplastic resin having a resistivity of at least $10^{14}$ ohm·cm, preferably of at least $10^{16}$ ohm·cm. Suitable nonconductive thermoplastic resins include those that have the capability of possessing a non-transitory or long lived trapped charge. The resin can be a homopolymer or copolymer or polymer blend. Suitable polymers include polyolefins; such as polypropylene, poly(4-methyl-1-pentene) or linear low density polyethylene; polyvinylchloride; polystyrene; polycarbonate and polyester. It has been found that for desirable performance over the lifetime of the filter device, in particular upon exposure of elevated temperatures, such as 60° C. or higher, more suitably 80° C. or higher, it is advantageous that the microfibers are substantially free (e.g. less than 2% by weight), more preferably free of polyethylene. Preferably the thermoplastic resin is selected from polypropylene, poly(4-methyl-1-pentene), polystyrene, polycarbonate, polyester and mixtures thereof, more preferably polypropylene, poly(4-methyl-1-pentene), blends thereof or copolymers formed from at least one of propylene and 4-methyl-1-pentene. The major component of the polymer or polymer blend is preferably polypropylene because of polypropylene's high resistivity, satisfactory charge stability, hydrophobicity and resistance to humidity:

The thermoplastic microfibers of the filter layer also comprise an additive selected from fluorochemical compounds and oligomers, triazine compounds or oligomers, hindered amine compounds, aromatic amine compounds, nitrogen containing hindered phenols, metal containing hindered phenols and mixtures thereof. The additive advantageously enhances the filtration performance of the filtration medium and is referred to in the following as a performance enhancing additive.

Suitable fluorochemical performance-enhancing additives include fluorochemical compounds and oligomers such as those described by Jones et al., U.S. Pat. No. 5,472,481 and Rousseau et al., WO 97/07272, the contents of which are incorporated herein by reference. Fluorochemical additives desirably include organic compounds or oligomers containing at least one perfluorinated moiety, such as fluorochemical piperazines, stearate esters of perfluoroalcohols, fluorochemical oxazolidinones. Such compounds or oligomers preferably have a fluorine content of at least about 18 percent by weight. Desirably such fluorochemical additives are thermally stable, i.e. thermally stable at the extrusion temperature of the polymeric resin in order to withstand processing without undesirable degradation or volatilization; usually molecular weights of 500 or greater are sufficient to avoid excessive volatilization. Desirably the fluorochemical compound or oligomer has a melting point above the melting point of the thermoplastic resin polymer(s) and below the extrusion temperature. For processing considerations, for example when using polypropylene, the fluorochemicals preferably have a melting point above 160° C. and more preferably a melting point of 160° C. to 290° C. Preferred fluorochemical additives include Additives A, B and C of U.S. Pat. No. 5,411,576 having the respective structures, Suitable triazine compounds or oligomers include those described in WO 97/07272, again the content of which is incorporated herein by reference. Triazine additives desirably include organic triazine compounds or oligomers with at least one additional nitrogen-containing group. Again such additives are desirably thermally stable (thermally stable at the extrusion temperature of the polymeric resin in order to withstand processing without undesirable degradation or volatilization). Such compounds or oligomers having a molecular weight of usually at least 500 generally do not undergo volatilization. Preferred triazines include those having the following generic structure, where $R_2$ is an alkyl group, which may be straight chain or branched and preferably having 4 to 10 carbon atoms and n is a number from 2 to 40, preferably 2 to 20.

The performance enhancing additive may suitably be a hindered or aromatic amine compound; preferably a compound containing a hindered amine such as those derived from tetramethylpiperidine rings, where R is hydrogen or an alkyl group. Preferably the hindered amine is associated with a triazine group as described above. Alternatively, nitrogen or metal containing hindered phenol charge enhancers may be suitably used, such as those disclosed in U.S. Pat. No. 5,057,710, the content of which is incorporated herein by reference in its entirety.

The nonwoven web of the filter layer of the filtration medium preferably contains at least 0.01 weight percent, more preferably 0.1 weight percent, even more preferably at least 0.2 weight percent and most preferably at least 0.5 weight percent of performance-enhancing additive based on the weight of the web. The nonwoven web of the filter layer preferably contains at most 10 weight percent, more preferably at most 5.0 weight percent and most preferably at most 2.0 weight percent of performance-enhancing additive based on the weight of the web.

Suitably the fibers of the nonwoven web of the filter layer are formed from a blend of thermoplastic resin and additive. In particular, resin and performance-enhancing additive may be blended as solids before melting them, or melted separately and blended together as liquids. Alternatively, additive and a portion of resin can be mixed as solids and melted to form a relatively additive-rich molten blend that is subsequently combined with a further portion of resin.

The fibers of the nonwoven web of the filter layer are preferably formed by melt blowing using melt-blowing processes and apparatuses that are well known in the art. For example in producing fibers forming a melt blown nonwoven web for the filter layer of the filtration medium, a molten blend of resin and additive may be extruded through a fiber die onto a collecting surface and formed into a web of thermoplastic microfibers. Such microfibers are typically integrally bonded each to the other at their crossover points either during the web formation process or after the web formation process. The fibers can be a single layer or multiple layers or of a sheath-core configuration. If multiple layers are employed at least some of the outer layers or the sheath layer preferably contain the performance-enhancing additive as described in the blends.

The collected web material may be annealed to increase electrostatic charge stability in the presence of oily mists. Preferably, the annealing step is conducted at a sufficient temperature and for a sufficient time to cause the performance-enhancing additive to diffuse to the interfaces (e.g., the polymer-air interface, and the boundary between crystalline and amorphous phases) of the material. Generally, higher annealing temperatures allow shorter annealing times. To obtain desirable properties for the final product, annealing of polypropylene materials are generally conducted above about 100° C. Preferably, annealing is conducted from about 130 to 155° C. for about 2 to 20 minutes; more preferably from about 140 to 150° C. for about 2 to 10 minutes; and still more preferably about 150° C. for about 4.5 minutes. Annealing should be conducted under conditions that do not substantially degrade the structure of the web. For polypropylene webs, annealing temperatures substantially above about 155° C. may be undesirable because the material can be damaged.

Fibers of the nonwoven web of the filter layer are electret charged. Examples of electrostatic charging methods useful to produce electret charged fibers include those described in U.S. Pat. Nos. 5,401,446 (Tsai, et al.), 4,375,718 (Wadsworth et al.), 4,588,537 (Klaase et al.), and 4,592,815 (Nakao). For yet further enhanced filtration performance (e.g. particle capture efficiency), fibers of the nonwoven web are preferably hydrocharged, i.e. nonwoven web is subjected to hydrocharging by impinging jets of water or a stream of water droplets onto the web at a pressure sufficient to provide the web with a filtration enhancing electret charge (see e.g. U.S. Pat. No. 5,496,507 to Angadjivand et al). The pressure necessary to achieve optimum results will vary depending on the type of sprayer used, the type of polymer from which the web is formed, the type and concentration of additives to the polymer, the thickness and density of the web. Generally, pressures in the range of about 10 to 500 psi (69 to 3450 kPa) are suitable. Preferably the water used to provide the water droplets is relatively pure. Distilled or deionized water is preferable to tap water. The jets of water or stream of water droplets can be provided by any suitable spray means. Apparatus useful for hydraulically entangling fibers are generally useful, although operation is carried out at lower pressures in hydrocharging than generally used in hydroentangling. It has been found that for favourable enhanced filtration performance it is advantageous not to subject the fibers of the nonwoven web to a corona discharge or a high pulsed voltage, for example as a pre- or post-treatment, to hydrocharging, more particularly it has been found particularly advantageous that the fibers of the nonwoven web are only hydrocharged e.g. the fibers are not subjected to other types of charging (as a pre- or post-treatment) to hydrocharging.

The nonwoven web of filter layer of the filtration medium has a basis weight of less than 60 g/m², preferably 55 g/m² or less, most preferably 50 g/m² or less. The nonwoven web of the filter layer of the filtration medium generally has a basis weight of 20 g/m² or more, more preferably 25 g/m² or more, most preferably 30 g/m² or more.

Air permeabilities of 1000 l/(m²×s) or more at 200 Pa as e.g. determined in accordance with DIN 53887 (for the flat material) for nonwoven web of filter layer have been found to be particularly favorable for desirable filtration performance, with air permeabilities of 1250 l/(m²×s) or more at 200 Pa being even more favorable and air permeabilities of 1500 l/(m²×s) or more at 200 Pa most favorable. Generally, air permeabilities of 4250 l/(m²×s) or less at 200 Pa are suitable for nonwoven web of filter layer, 3750 l/(m²×s) or less at 200 Pa more suitable and 3250 l/(m²×s) or less at 200 Pa most suitable.

For desirable dimensional and pleating considerations and thus favorable filtration performance of filtration medium, favorable thicknesses of filter layer are 1.50 mm or less, more favorable 1.25 mm or less and most favorably 1.00 mm or less (as e.g. measured in accordance ISO 534 applying a stamp pressure of 2 N/cm²). Suitably the thickness of the filter layer is at least 0.25 mm, more suitably at least 0.35 mm, most suitably at least 0.45 mm.

As mentioned above the filtration medium includes a gas adsorption layer comprising a layer loaded with adsorbent particles and optionally a support layer and/or a cover layer bonded to said activated carbon layer.

Support and cover layers, if used, generally facilitate manufacture, handling and/or converting and/or facilitate structural integrity. Such layers, which may suitably be made of nonwoven (e.g. wetlaid, airlaid (such as spunlace, calendered, needle-punched, chemical bonded airlaids), spunbond, nonwovens), woven, netting, tissue or scrim-like material, typically have high air permeabilities greater than 4250 l/(m²×s) at 200 Pa or more (more suitably 4750 l/(m²×s) at 200 Pa or more, most suitably 5500 l/(m²×s) at 200 Pa or more for the flat material (e.g. as determined in accordance with DIN 53887). For desirable performance over the lifetime of the filter device, in particular upon exposure of elevated temperatures, such as 60° c. or higher (more suitably 80° C. or higher), it is advantageous that support and/or cover layers comprise a polymeric resin, in particular a polymeric resin substantially free (e.g. less than 2% by weight), more preferably free of polyethylene. Preferably the polymeric resin is selected from polypropylene, polystyrene, polycarbonate, polyester as well as mixtures, copolymers and blends thereof. Support and/or covers layer typically have a thickness of 0.6 mm or less, more suitable 0.5 mm or less. Within this range a minimal thickness of 0.05 mm is suitable, 0.1 mm more suitable.

The adsorbent particle loaded layer may be desirably configured as a nonwoven web of thermoplastic microfibers (e.g. of the thermoplastic resin type described above in connection with thermoplastic resin used for the filter layer web), more desirably electret charged microfibers, in which the adsorbent particles are arranged and secured on the web and/or within the fibrous web structure. The adsorbent particle loaded layer may be desirably formed of a woven web or netting of thermoplastic yards (e.g. of the thermoplastic resin type described above in connection with thermoplastic resin used for the filter layer web) in which adsorbent particles, preferably activated carbon particles, are arranged and secured on and/or within the woven web or netting. It has been found particularly advantageous to use an adsorbent particle loaded layer formed of melt adhesive threads and/or dots in which adsorbent particles, preferably activated carbon particles, are fixed at least pointwise to said threads and/or dots. Such adsorption layers are typically provided on a support layer (e.g. during converting or during manufacture of the adsorbent particle loaded layer) and may optionally include a cover layer. In regard to adsorbent layers formed melt adhesive threads and/or dots, desirably said melt adhesive threads and/or dots loaded with adsorbent particles form an air permeable three-dimensional structure or netting. Such adsorption layer configurations are disclosed for example in U.S. Pat. No. 6,423,123 and EP 818 230, the contents of both of which are incorporated herein in their entirety. Desirably the melt adhesive proportion is between 2 and 30% by weight of the mass of the adsorbent particle loaded layer and the support layer. Suitable melt adhesives include melt adhesives, preferably water-activated melt adhesives, comprising a polyester, polypropylene, polycarbonate, polyurethane or polyamide based material.

Suitably, the adsorbent particles may comprise activated carbon, activated alumina, silica gel, carbon black, zeolite particles or mixtures thereof. Activated carbon particles are preferred. Suitable particle sizes for the adsorbent particles are found in the range of 100 to 2000 µm, preferably 100 to 1000 µm. The complete range is not one material, but rather different overlapping size ranges are preferably such as 149-420 µm (40×100 US Std. Mesh), 210-595 µm (30×70 US Mesh), 250-500 µm (35×60 US Std. Mesh), 354-710 (25×45 US Std. Mesh), 420-841 µm (20×40 US Std. Mesh) and 500-1000 (18×35 US Std. Mesh). Typical particle sizes that can be used are (from 20 to 35)×(from 40 to 70) US. Std Mesh.

The basis weight for adsorbent particles, preferably activated carbon particles, contained in the gas adsorption layer is at least 150 g/m², preferably at least 200 g/m² and even more preferably at least 250 g/m², most preferably at least 300 g/m². The basis weight for adsorbent particles in the gas adsorption layer is typically at most 1500 g/m², more suitably 1250 g/m², and most suitably 750 g/m².

For desirable dimensional and pleating considerations and thus favorable filtration performance of filtration medium, favorable thicknesses of the gas adsorption layer (including any optional support and/or cover layer) are 2.75 mm or less, more favorably 2.50 mm or less, even more favorably 2.00 mm or less, and most favorably 1.50 mm or less (e.g. as measured in accordance with ISO 534, 2.0 N/cm²). Suitably the thickness of the gas adsorption layer may be 0.60 mm or greater, more suitably 0.70 mm or greater, most suitably 0.80 mm or greater. More particularly it has been found advantageous for favorable gas adsorption and overall performance of the filtration media, to provide a gas adsorption layer having an overall thickness 2.75 mm or less (more preferably 2.50 mm or less, even more preferably 2.00 mm or less, most preferably 1.50 mm or less) and to select the appropriate basis weight of loaded adsorbent particles and the thickness of the gas adsorption layer such that a density of adsorbent particles, preferably activated carbon particles, of at least 150,000 g/m³ (more preferably at least 165,000 g/m³, most preferably at least 180,000 g/m³) is provided in the gas adsorption layer.

Air permeabilities of 800 l/(m²×s) at 200 Pa or more as e.g. determined in accordance with DIN 53887 (for the flat material) for the gas adsorption layer have been found to be particularly favorable for desirable overall filtration performance of filter devices, with air permeabilities of 1000 l/(m²×s) at 200 Pa or more being even more favorable and air permeabilities of 1200 l/(m²×s) or more most favorable. Generally, air permeabilities of 4250 l/(m²×s) at 200 Pa or less are suitable, 3750 l/(m²×s) at 200 Pa or less more suitable and 3000 l/(m²×s) at 200 Pa or less most suitable.

Filter devices of the present invention will typically show advantageously high initial particle capture efficiency of at least 90% (more desirably at least 93%, most desirably at least 95%) for 0.4 µm particles for example as measured according to DIN 71460-1. Also filter devices of the present invention will typically show desirable maintenance of particle capture efficiency upon loading, such as particle capture efficiencies of at least 87% (more desirably 90%, most desirably 93%) for 0.4 µm particles during loading at an increase of 50 Pa in pressure drop, e.g. as measured according to DIN 71460-1.

Filter devices of the present invention will typically show desirable loading capacities of at least 20 g (more desirably at least 23 g) after an increase in pressure drop of 100 Pa, e.g. as measured according to DIN 71460-1.

Filter devices of the present invention will typically, show advantageously low initial pressure drops of not more than 100 Pa (more advantageously not more than 90 Pa, most advantageously not more than 80 Pa) for filters with a filter face area of 250 mm×200 mm, a pleat height of 30 mm and a pleat distance (peak to peak) of 5 to about 12 mm (more suitably a pleat distance of 6 to 10 mm, most suitably a pleat distance of 8 mm) at a volumetric flow rate of 225 m³/h, e.g. as measured according to DIN 71460-1.

Filter devices of the present invention will typically show a favorable initial adsorption efficiency for at least one n-butane, toluene, $SO_2$ (more favorably for at least two thereof, most favorably for all three) of at least 60% (more desirably at least 70%, most desirably at least 80%), e.g. as determined according to DIN 71460-2.

The invention will be illustrated by the following Examples.

Preparation of Melt Blown Nonwoven Webs for the Filter Layer

Oligomeric hindered amine CHIMASSORB™ 944FL (available from Ciba-Geigy Corp., Hawthorne/N.Y., USA) was melt compounded into poly(4-methyl-1-pentene) (TPX DX 820, available from Mitsui Petrochemical Industries, Tokyo, Japan) in a single screw extruder in a 40:60 ratio and the resultant blend was extruded into a large diameter fiber. The fiber was subsequently ground into a powder (0.125 inch mesh). The powder was added to the a polypropylene pellet (a 400 melt flow index polypropylene resin available from Exxon Corp., Houston/TX, USA) feed during preparation of melt blown microfiber web to obtain a polypropylene resin composition consisted of 98 wt. % polypropylene, 1.2 wt. % poly(4-methyl-1-pentene), and 0.8 wt. % CHIMASSORB™ 944FL. This resin blend was fed into an extrusion process for preparing a melt blown microfiber web using a melt blowing process similar to that described, for example, in Wente, "Superfine Thermoplastic Fibers," in Industrial Engineering Chemistry, Vol. 48, pages 1342 et seq (1956) or in Report No. 4364 of the Naval Research Laboratories, published May 25, 1954, entitled "Manufacture of Superfine Organic Fibers" by Wente et al. The extruder had four temperature control zones which were maintained at 250° C., 290° C., 320° C., and 320° C., the flow tube connecting the extruder to the die (with 25 holes) was maintained at 300° C., and melt blown die was maintained at 300° C. The primary air was maintained at about 400° C. and 690 kilopascals (kPa) with a 0.076 cm gap width, to produce a uniform web. The polypropylene resin composition described above was delivered from the die at a rate of 0.3 g/hole/min. and the resulting web collected on a perforated rotating drum collector positioned at the collector/die distance 15 inches. The collector drum was connected to a vacuum system which could be optionally turned on or off while collecting the melt blown microfiber web, thereby allowing a higher solidity web to be prepared when a vacuum was applied to the collector drum. In all cases, lower basis weight BMF webs were obtained by increasing the rotational speed of the collector rather than reducing the resin delivery rate. The average effective fiber diameter (EFD) for the webs obtained from this process was 12 µm. Three basis weight webs were prepared 30 g/m², 40 g/m² and 50 g/m². The prepared webs were subsequently charged using a hydro-charging process substantially as described in U.S. Pat. No. 5,496,507 (Angadjivand et. al.) using a water pressure of about 100 (690 kPa). (No pre- or post-charging treatment was applied.) The charged meltblown web material was wound on a roll for further processing to prepare filters.

The following summarized the prepared meltblown microfiber web materials

| Designation | Basis weight (g/m²) | EFD (µm) | Air permeability (l/m² × s) at 200 Pa | Thickness (mm) |
|---|---|---|---|---|
| M3 | 30 | 12 | 2856 | 0.61 |
| M4 | 40 | 12 | 2039 | 0.71 |
| M5 | 50 | 12 | 1586 | 0.86 |

Preparation of Activated Carbon Containing Webs for Gas Adsorption Layer

Activated carbon particle containing composites webs consisting of a bottom and a top layer and an intermediate layer activated carbon particles fixed at least pointwise to adhesive threads and dots were prepared according to the process described in EP 0 818 230. Three different basis weights for activated carbon were prepared, 200 g/m², 300 g/m² and 400 g/m². 20 g/m² of a water activated, softened polyurethane based hot melt-type adhesive was sprayed onto a PET spunbond web (Reemay 2275; basis weight 25 g/m² and air permeability 6000 l/(m²×s) at 200 Pa), and directly followed by the application of a first charge of activated carbon particles (coconut shell based; 35×60 US mesh and/or 20×40 US mesh). Subsequently a second layer (20 g/m²) of sprayed-on adhesive was applied, immediately followed by an application of a second charge of activated carbon particles. Finally a third layer of adhesive (20 g/m²) was sprayed on, followed by the application of a second PET spunbond web (Reemay 2275) as a cover layer. The resulting web material was wound on a roll, and after setting of the adhesive through activation via the presence of moisture (in the web components and ambient environment), the roll was used for further processing to prepare filters.

The following summarized the prepared activated carbon web materials

| Designation | Basis weight of activated carbon (g/m²) | Size of activated carbon particles (US Mesh) | Basis weight of web (g/m²) | Air permeability (l/m² × s) at 200 Pa | Thickness (mm) |
|---|---|---|---|---|---|
| C2 | 200 | 35 × 60 | 310 | 1850 | 0.90 |
| C3 | 300 | 20 × 40 & 35 × 60 | 410 | 1450 | 1.10 |
| C4 | 400 | 20 × 40 & 35 × 60 | 510 | 1650 | 1.50 |

Preparation of Exemplary Vehicle Passenger Compartment Air Filter Devices

Web material fed from a roll of prepared melt blown microfiber web (as described above) and web material fed from a roll of gas adsorption material (as described above) were superimposed and aligned via passing guiding rolls and subsequently fed between a "crush-cut" unit with rotating discs and a pressure roller, to provide preliminary cuts/incisions is the superimposed material. The superimposed and pre-cut material were then pleated using a pleater unit (Rabowski Blade Pleater, commercially available from the company Rabowski, Berlin, Germany). In each instance the pleat height was 30 mm. The co-pleated medium was then cut in cross-direction appropriately for the number of pleats and pleat distance (the pleat distance was either 6 mm, 8 mm or 10 mm) for the test filter and manually separated along the preliminary cut line. The separated co-pleated medium packs were then manually glued on a cardboard frame to give a filter with dimensions, i.e. a filter face area, of 250×200 mm. In this manner the following vehicle passenger compartment air filters were prepared:

| Ex. No. | Filter layer material (upstream) | Gas adsorption layer material (downstream) | Pleat distance (mm) | No. of pleats | Designation |
|---|---|---|---|---|---|
| 1 | M3 | C2 | 6 | 42 | M3/C2-6 |
| 2 | M3 | C2 | 8 | 31 | M3/C2-8 |
| 3 | M3 | C2 | 10 | 25 | M3/C2-10 |
| 4 | M3 | C3 | 6 | 41 | M3/C3-6 |
| 5 | M3 | C3 | 8 | 31 | M3/C3-8 |
| 6 | M3 | C3 | 10 | 25 | M3/C3-10 |
| 7 | M4 | C2 | 6 | 42 | M4/C2-6 |
| 8 | M4 | C4 | 8 | 31 | M4/C4-8 |
| 9 | M5 | C2 | 6 | 42 | M5/C2-6 |
| 10 | M5 | C2 | 8 | 31 | M5/C2-8 |

Testing Methods/Procedures

Testing for particulate filtration, e.g. particle efficiency, loading, and initial pressure drop, was conducted in accordance with E DIN 71460-1:2003-05 at an air temperature of 23+/−2° C. and a relative humidity of 50+/−3% (under ambient environmental pressure 1013 hPa) using a flow rate of 225 m³/h and 1.5 bar work pressure.

Test dust A4 (SAE coarse test dust) according to DIN ISO 12103-1 was used, together a fluidized bed from TSI type 3400 as an aerosol generator and a TSI APS Model 3321 particle counter having a measurement range of 0.5 to 11 μm aerodynamic particle size (0.3 to 7 μm geometric particle size). (No size specific dilutor was applied.)

Initial efficiencies for 0.4 μm geometric particles are reported herein as well as efficiencies for such particles during loading at pressure drop increases (dP) of 50 and 100 Pa.

For loading tests, filter sample was conditioned in accordance with comment 2 of section 8.3 of the DIN, and then the filter was loaded at aforesaid flow rate and work pressure with aforesaid test dust at a concentration of 160 mg/m³ to a final pressure drop equal to the pre-measured initial pressure drop plus 100 Pa in 4 steps of 25 Pa each.

Testing for Adsorptive Filtration of n-Butane, Toluene and $SO_2$ was conducted in accordance with E DIN 71460-2:1994-11 at an air temperature of 23+/−3° C. and a relative humidity of 50+/−3% (under ambient environmental pressure 1013 hPa) using a flow rate of 225 m³/h and 1.5 bar work pressure. Filter samples were conditioned as outlined in part 5 and 3.1.2 of the aforesaid DIN.

For testing of n-butane and toluene, concentration (upstream) of the test compound in a mixture of said test compound and clean air was in each case 80 ppm, and for $SO_2$ testing 30 ppm.

Using a gas analyzer (for n-butane and toluene series 8800 FID from Mocon Inc. and for $SO_2$ of the type ML 98 B from Monitor Lapse Inc.) and monitoring the concentration of test compound downstream during loading and at the following loading times, 0, 1, 2.5, 5, 7.5, 10, 12.5 and 15 minutes, efficiency was determined.

Capacity after gas loading for 15 minutes (instead of up to a break-through time as described in section 6.3 of aforesaid DIN) was determined in accordance with Appendix B of aforesaid DIN wherein $t_E$ is 15 minutes (rather the break-through time).

Results for Particle Efficiency and Air Flow Testing for the Exemplary Vehicle Passenger Compartment Air Filters are Given in the Following Table:

Results for the Gas Efficiency and Capacity Testing for the Exemplary Vehicle Passenger Compartment Air Filters are Given in the Following Table:

| Example No. (Designation) | Initial efficiency for 0.4 μm particles (%) | Loading after an increase of 100 Pa (g) | Efficiency during loading [dp = 50 Pa] for 0.4 μm particles (%) | Efficiency during loading [dp = 100 Pa] for 0.4 μm particles (%) | Initial Pressure drop (Pa) |
|---|---|---|---|---|---|
| 1 (M3/C2-6) | 97.9 | 35.0 | 97.1 | 98.0 | 57 |
| 2 (M3/C2-8) | 97.7 | 28.0 | 97.0 | 97.6 | 49 |
| 3 (M3/C2-10) | 97.2 | 23.0 | 95.9 | 96.8 | 59 |
| 4 (M3/C3-6) | 96.6 | 35.4 | 94.9 | 95.7 | 78 |
| 5 (M3/C3-8) | 97.0 | 29.8 | 94.9 | 97.3 | 59 |
| 6 (M3/C3-10) | 95.7 | 24.0 | 94.4 | 97.1 | 63 |
| 7 (M4/C2-6) | 98.6 | 28.0 | 99.7 | 99.9 | 54 |
| 8 (M4/C4-8) | 98.7 | 30.0 | 99.7 | 99.9 | 66 |
| 9 (M5/C2-6) | 98.5 | 36.7 | 99.8 | 99.7 | 62 |
| 10 (M5/C2-8) | 98.8 | 30.1 | 99.8 | 99.9 | 55 |

| | Initial gas efficiency | | | Gas capacity after 15 minutes of gas loading | | |
|---|---|---|---|---|---|---|
| Example No. (Designation) | n-butane (%) | $SO_2$ (%) | Toluene (%) | n-butane (g) | $SO_2$ (g) | Toluene (g) |
| 1 (M3/C2-6) | 78.4 | 82.0 | 86.0 | 2.8 | 1.7 | 20.1 |
| 2 (M3/C2-8) | 70.2 | 76.6 | 84.3 | 2.0 | 1.3 | 16.1 |
| 3 (M3/C2-10) | 61.3 | 68.1 | 83.0 | 1.4 | 1.1 | 12.8 |
| 4 (M3/C3-6) | 86.0 | 94.0 | 95.0 | 4.7 | 1.8 | 30.7 |
| 5 (M3/C3-8) | 90.0 | 94.0 | 94.0 | 4.1 | 1.8 | 24.2 |
| 6 (M3/C3-10) | 84.1 | 83.3 | 93.0 | 3.0 | 1.5 | 19.2 |
| 7 (M4/C2-6) | 79.1 | 83.1 | 85.4 | 3.1 | 2.0 | 12.4 |
| 8 (M4/C4-8) | 86.9 | 95.1 | 92.2 | 4.7 | 2.6 | 30.3 |
| 9 (M5/C2-6) | 81.0 | 80.0 | 87.1 | 2.7 | 1.8 | 18.8 |
| 10 (M5/C2-8) | 69.1 | 77.1 | 83.4 | 2.0 | 1.6 | 20.2 |

I claim:

1. A vehicle passenger compartment air filter device comprising a filtration medium comprising
   (i) a meltblown nonwoven web of electret charged thermoplastic microfibers as a filter layer, said microfibers having an effective fiber diameter (EFD) of greater than 10 μm and comprising a thermoplastic resin having a resistivity greater than $10^{14}$ ohm·cm and an additive selected from fluorochemical compounds or oligomers, organic triazine compounds or oligomers, hindered amine compounds, aromatic amine compounds, nitrogen containing hindered phenols, metal containing hindered phenols and mixtures thereof; said web having a basis weight less than 60 $g/m^2$; and
   (ii) a gas adsorption layer comprising an adsorbent particle loaded layer and optionally further comprising a support layer and/or a cover layer bonded to said adsorbent layer, wherein basis weight of adsorbent particles in gas adsorption layer is at least 150 $g/m^2$;
   said filter layer being upstream from the gas adsorption layer and the filter layer and gas adsorption layer being co-pleated and substantially non-bonded to one another except optionally at one or more of the outer edges of the filtration medium;
   wherein the filter device has an initial particle capture efficiency of at least 90% for 0.4 μm particles, and further wherein the filter device has a particle capture efficiency of at least 87% for 0.4 μm particles during loading at an increase in pressure drop of 50 Pa;
   wherein the filter device has a loading capacity of at least 60 $g/m^2$ after an increase in pressure drop of 100 Pa.

2. An air filter device according to claim 1, wherein the filtration medium is free of at least one of a pre-filter layer upstream of said filter layer and a second particle filter layer downstream of said filter layer.

3. A vehicle passenger compartment air filter device comprising a filtration medium consisting essentially of
   (i) a meltblown nonwoven web of electret charged thermoplastic microfibers as a filter layer, said microfibers having an effective fiber diameter (EFD) of greater than 10 μm and comprising a thermoplastic resin having a resistivity greater than $10^{14}$ ohm·cm and an additive selected from fluorochemical compounds or oligomers, organic triazine compounds or oligomers, hindered amine compounds, aromatic amine compounds, nitrogen containing hindered phenols, metal containing hindered phenols and mixtures thereof said web having a basis weight less than 60 $g/m^2$; and
   (ii) a gas adsorption layer comprising an adsorbent particle loaded layer and optionally further comprising a support layer and/or a cover layer bonded to said adsorbent layer, wherein basis weight of adsorbent particles in gas adsorption layer is at least 150 $g/m^2$;
   said filter layer being upstream from the gas adsorption layer and the filter layer and gas adsorption layer being co-pleated and substantially non-bonded to one another except optionally at one or more of the outer edges of the filtration medium;
   wherein the filter device has an initial particle capture efficiency of at least 90% for 0.4 μm particles, and further wherein the filter device has a particle capture efficiency of at least 87% for 0.4 μm particles during loading at an increase in pressure drop of 50 Pa;
   wherein the filter device has a loading capacity of at least 55 $g/m^2$ after an increase in pressure drop of 100 Pa.

4. An air filter device according to claim 3, wherein the microfibers of the filter layer nonwoven web are hydrocharged.

5. An air filter device according to claim 3, wherein the microfibers of the filter layer have an EFD of 20 μm or less.

6. An air filter device according to claim 3, wherein the filter layer has a basis weight of 20 $g/m^2$ or more.

7. An air filter device according to claim 3, wherein the filter layer nonwoven web has an air permeability of 1000 l/(m²xs) at 200 Pa or more, and further wherein the filter layer nonwoven web has an air permeability of 4250 l/(m²xs) at 200 Pa or less.

8. An air filter device according to claim 3 wherein the filter layer nonwoven web has a thickness of 1.5 mm or less, and wherein the filter layer nonwoven web has a thickness of 0.25 mm or more.

9. An air filter device according to claim 3, wherein the adsorbent particles are selected from the group consisting of activated carbon, activated alumina, silica gel, carbon black and zeolite particles.

10. An air filter device according to claim 3, wherein the basis weight of adsorbent particles in gas adsorption layer is at most 1500 g/m².

11. An air filter device according to claim 3, wherein the gas adsorption layer has a thickness of 2.75 mm or less, and further wherein the gas adsorption layer has a thickness of 0.60 mm or more.

12. An air filter device according to claim 11, wherein the density of adsorbent particles in the gas adsorption layer is 150,000 g/m³ or more.

13. An air filter device according to claim 3, wherein the gas adsorption layer has an air permeability of 800 l/(m²xs) or more at 200 Pa, and further wherein the gas adsorption layer has an air permeability of 4250 l/(m²xs) at 200 Pa or less.

14. An air filter device according to claim 3, wherein the adsorbent particle loaded layer is configured as one of a nonwoven web of thermoplastic microfibers, a woven web or a netting of thermoplastic yarns, and further wherein the adsorbent particles are arranged and secured on the web, within the fibrous structure of the web or a combination thereof.

15. An air filter device according to claim 3, wherein the adsorbent particle loaded layer is formed of at least one of melt adhesive threads and dots in which adsorbent particles are fixed at least pointwise to said at least one of melt adhesive threads and dots.

16. An air filter device according to claim 3, wherein the filter device has a loading capacity of at least 20 g after an increase in pressure drop of 100 Pa.

17. An air filter device according to claim 3, wherein the filter device has an initial pressure drop of not more than 100 Pa at a volumetric flow rate of 225 m³/h, when such filter device has a filter face area of 250 mm×200 mm, a pleat height of 30 mm and a pleat distance of 5 to about 12 mm.

18. An air filter device according to claim 3, wherein the filter device has an initial adsorption efficiency for at least one of n-butane, toluene, and at least 60% of $SO_2$.

19. The air filter device of claim 1 wherein the initial particle capture efficiency and the particle capture efficiency during loading at an increase in pressure drop of 50 Pa are measured at an air velocity through the filter media in a range from about 12 cm/s to about 21 cm/s.

20. The air filter device of claim 3 wherein the initial particle capture efficiency and the particle capture efficiency during loading at an increase in pressure drop of 50 Pa are measured at an air velocity through the filter media in a range from about 12 cm/s to about 21 cm/s.

\* \* \* \* \*